July 10, 1956 D. A. SMITH 2,753,857
ENGINE VALVE CONSTRUCTION AND METHOD OF MAKING SAME
Filed Sept. 22, 1952

Daniel A. Smith
INVENTOR.

BY *Clarence A. O'Brien*
*and Harvey B. Jacobson*
Attorneys

United States Patent Office 2,753,857
Patented July 10, 1956

2,753,857

ENGINE VALVE CONSTRUCTION AND METHOD OF MAKING SAME

Daniel A. Smith, Norfolk, Va.

Application September 22, 1952, Serial No. 310,825

2 Claims. (Cl. 123—188)

This invention comprises novel and useful improvements in an engine valve construction and method of making the same, and more specifically pertains to an engine poppet valve which shall be so constructed as to be more resistant to breakage in use and will prevent the falling of a valve head into the combustion chamber of an engine in the event that the head is broken from the stem of the valve.

The primary object of this invention is to provide a valve construction wherein the danger of breakage of a poppet valve is materially reduced if not entirely eliminated; and wherein the danger of the broken head of a poppet valve falling into the combustion chamber of an engine is substantially entirely prevented.

A further object of the invention is to provide an improved poppet valve having the aforementioned advantages which may be readily employed as a replacement for conventional poppet valves in the conventional valve assemblies of internal combustion engines.

Yet another object of the invention is to provide a poppet valve in which breakage of the same is considerably reduced; and wherein, in the event of breakage, the head of the poppet valve is positively prevented from falling into the combustion chamber of an engine.

A still further object of the invention is to provide a poppet valve having means positively preventing the head portion of the valve stem from passing into the combustion chamber of an engine in the event of breakage of the valve head from its stem.

A still further important object of the invention is to provide an improved method for manufacturing a poppet valve which shall have the above-mentioned characteristics and advantages.

These, together with various ancillary features and objects of the invention, which will later become apparent as the following description proceeds, are attained by the present invention, a preferred embodiment of which has been illustrated, by way of example only, in the accompanying drawings, wherein.

Figure 3:
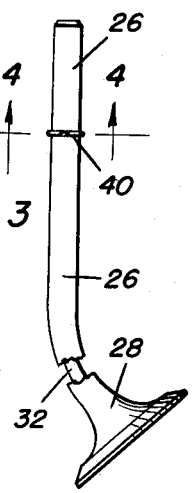
Figure 4:
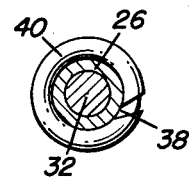

Figure 3 is an elevational view, showing the manner in which the head of a poppet valve is prevented from disengaging from the valve stem and from falling into the combustion chamber of an internal combustion engine in the event of breakage of the valve from its stem; and Figure 4 is a horizontal sectional view taken substantially upon the plane indicated by the section line 4—4 of Figure 3 and showing a retaining means preventing passage of the valve stem through the valve stem guide.

Referring now more specifically to the accompanying drawings, wherein like numerals designate similar parts throughout the various views, it will be seen that the reference numeral 10 indicates a portion of a cylinder head of an engine of the over-head valve type, this cylinder head having a combustion chamber a portion of which is indicated at 12 and which is provided with the usual valve seat 14 to which communicates a passage 16 by means of which intake or exhaust of the combustion chamber is effected. The cylinder head illustrated further includes the usual water cooling jacket assembly 18 together with a valve stem guide 20 through which the conventional poppet valve is guidingly reciprocated. There is further illustrated a valve closing coil spring 22 together with a spring retainer 24 by means of which the spring is secured to the extremity of the valve stem for yieldingly urging the valve to its closed position.

Figure 1:
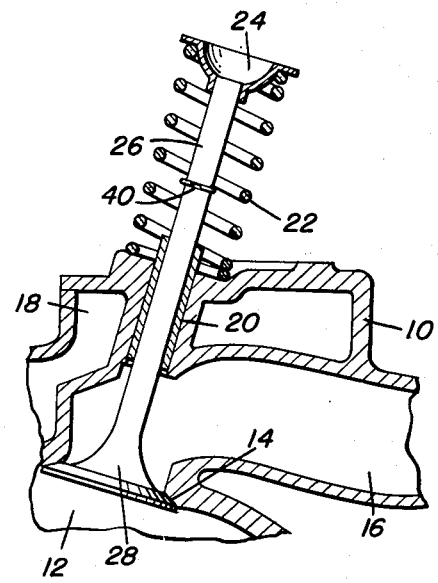
Figure 1 is a fragmentary vertical sectional view through a portion of the cylinder head of an engine showing the improved poppet valve of this invention installed therein, the valve being shown in its closed position and being illustrated as employed in a conventional over-head valve type of engine.
Figure 2:
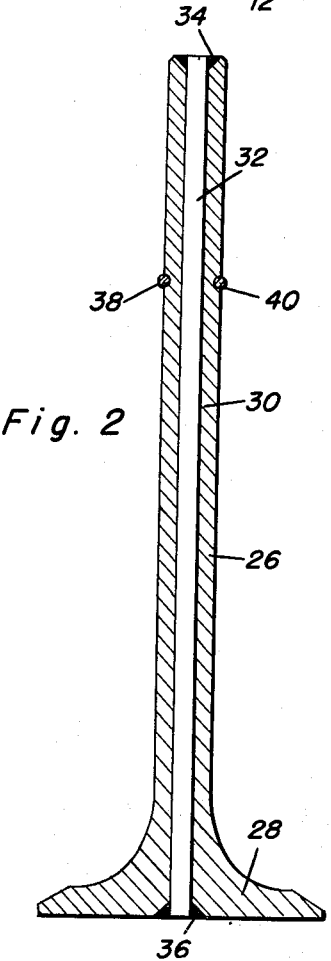
Figure 2 is a vertical central sectional view through the improved valve in accordance with this invention.

Referring now more specifically to Figure 2, it will be seen that the improved valve of this invention and which is adapted to replace the conventional poppet valve with which internal combustion engines are customarily equipped, consists of a valve stem 26 having rigidly and preferably integrally attached to one end thereof a poppet valve head 28. Disposed axially throughout the valve stem 26 and through the poppet valve head 28 secured thereto is a bore or passage 30 which may be either formed during the fabrication of the poppet valve, or may be subsequently drilled throughout the stem and head, as desired. In accordance with this invention, a reinforcing rod 32 is disposed in this bore 30 and terminates coextensively with the opposite ends of the valve stem and head, as shown. The opposite ends of the reinforcing rod are intimately bonded to the material at the opposite ends of the valve stem and head, as by welding or the like 34 and 36, the bore being countersunk or laterally enlarged at these extremities to receive the welding material as shown.

It is preferred to form the welding material of the same material as that of which the stem and head are formed, although this is not essential to the principles of this invention. It is preferred, however, to form the reinforcing rod 32 of the material which is of a greater heat resistant quality than that of the material of the valve stem and head, and also which is inherently more flexible and springy in its nature. In any event, the reinforcing rod is disposed axially within the valve stem and head and intimately bonded to the same.

It should be observed that the reinforcing rod can be fabricated into the valve stem and head during the manufacture of the latter, or may be subsequently installed after the valve and head have been completed.

In any event, the arrangement is such that when the poppet valve has been installed in the valve guide 20, the reinforcing rod which is of a more enduring material than that of the valve stem and head will retain the head upon the stem, even though in operation of the valve the head might become broken or otherwise disengaged from the stem. Such a condition is indicated in Figure 3, wherein it will be seen that the head has parted from the stem and except for the presence of the reinforcing rod 32 will drop from the stem down into the combustion chamber 12, where the same might cause damage to the operating parts of the engine.

It will thus be seen that even upon failure of the valve, the same is prevented from damaging the piston, cylinder walls, cylinder head or block of the engine.

At a convenient place upon the valve stem, there is provided a circumferentially extending, peripheral groove 38 in which is seated a removable split ring 40. Preferably, this groove and ring are positioned on that portion of the valve stem which is normally disposed on the opposite side of the valve guide 20 from the valve head 28. This split ring, in the event of breakage of the valve, will prevent the broken portion from dropping downwardly into the combustion chamber, since the ring will engage the upper or outer end of the valve guide and prevent passage of the stem through the same.

In the process or method of manufacturing the valve, it is to be understood that the reinforcing ring may be fabricated into the valve during the manufacture of the latter or, if preferred, the valve may be completed and an axial bore may be either left during the manufacture of the valve or may be drilled therein subsequent to its manufacture. The reinforcing rod may then be inserted in the bore and welded at its opposite ends to the countersunk recesses or lateral enlargements of the ends of the bore as shown in Figure 2, whereby a unitary article is provided. It will thus be seen that the reinforcing rod imparts additional qualities of breakage resistance, strength and durability to the valve.

Since from the foregoing, the construction and advantages of this device are readily apparent, further description is believed to be unnecessary.

However, since numerous modifications and equivalents will readily occur to those skilled in the art after a consideration of the foregoing specification and accompanying drawings, it is not intended to limit the invention to the exact embodiment shown and described, but all suitable modifications and equivalents may be resorted to which fall within the scope of the appended claims.

Having described the invention, what is claimed as new is:

1. A break resistant poppet valve for internal combustion engines comprising a valve stem with an integral valve head, said stem and head having a bore extending therethrough of constant cross-sectional area, a reinforcing rod of constant cross-sectional area of a different and more heat resistant material than said stem and head and disposed in said bore.

2. A break resistant poppet valve for internal combustion engines comprising a valve stem with an integral valve head, said stem and head having a bore extending therethrough of constant cross-sectional area, a reinforcing rod of constant cross-sectional area of a different and more heat resistant material than said stem and head and disposed in said bore, said rod being bonded at its opposite ends to said stem and head.

References Cited in the file of this patent

UNITED STATES PATENTS

| 1,444,210 | Rich | Feb. 6, 1923 |
| 2,360,795 | Rich | Oct. 17, 1944 |

FOREIGN PATENTS

| 7,928 | Great Britain | 1913 |
| 4,767 | Great Britain | Mar. 2, 1903 |
| 486,144 | Canada | Sept. 2, 1952 |